United States Patent
Kawai et al.

[11] Patent Number: 6,138,749
[45] Date of Patent: Oct. 31, 2000

[54] AUTOMOTIVE AIR-CONDITIONER WITH VENT AND AIR-MIXING DOOR INTERLOCKING MECHANISM

[75] Inventors: Takayoshi Kawai, Hoi-gun; Hiroshi Nonoyama, Toyota, both of Japan

[73] Assignee: Denso Corporation, Kariya, Japan

[21] Appl. No.: 09/169,899

[22] Filed: Oct. 12, 1998

[30] Foreign Application Priority Data

Oct. 13, 1997 [JP] Japan .................................. 9-278464

[51] Int. Cl.⁷ .................................................. F25B 29/00
[52] U.S. Cl. .............................. 165/204; 165/42; 165/43; 237/12.3 A; 237/12.3 B; 454/156; 454/121; 454/126
[58] Field of Search .................... 165/42, 43, 204; 454/121, 126, 156, 161; 237/12.3 A, 12.3 B

[56] References Cited

U.S. PATENT DOCUMENTS

| | | | |
|---|---|---|---|
| 2,742,844 | 4/1956 | Steadman | 165/42 |
| 4,157,113 | 6/1979 | Karran et al. | 165/42 |
| 4,383,642 | 5/1983 | Sumikawa et al. | 165/42 |
| 4,653,689 | 3/1987 | Sakurai et al. | 165/42 |
| 5,042,566 | 8/1991 | Hildebrand | 165/43 |

FOREIGN PATENT DOCUMENTS

| | | | |
|---|---|---|---|
| 0123520 | 9/1980 | Japan | 165/43 |
| 5-124426 | 5/1993 | Japan . | |

*Primary Examiner*—John K. Ford
*Attorney, Agent, or Firm*—Harness, Dickey & Pierce, PLC

[57] ABSTRACT

A motor vehicle air-conditioner having a structure that reduces production costs. Main and sub air-mixing doors and an inner-air FOOT door are mechanically interlocked with a single air-mixing door actuator. The shape of an engagement hole of a main link plate of a door-interlock device is formed to correspond to an operation pattern to rotate the main and sub air-mixing doors from MAX COOL to MAX HOT in an interval where a servomotor opening degree is from 0% to 80%. The shape of an engagement hole of a main link plate is such that the plate functions as a lost motion link plate that corresponds to an operation pattern to rotate the inner-air FOOT door from a fully closed state to a fully open state in an interval where the servomotor opening degree is from 80% to 100%. As a result, opening of the inner-air FOOT door becomes difficult even when the main and sub air-mixing doors are opened, and so leakage of conditioned air from a foot vent can be prevented.

10 Claims, 14 Drawing Sheets

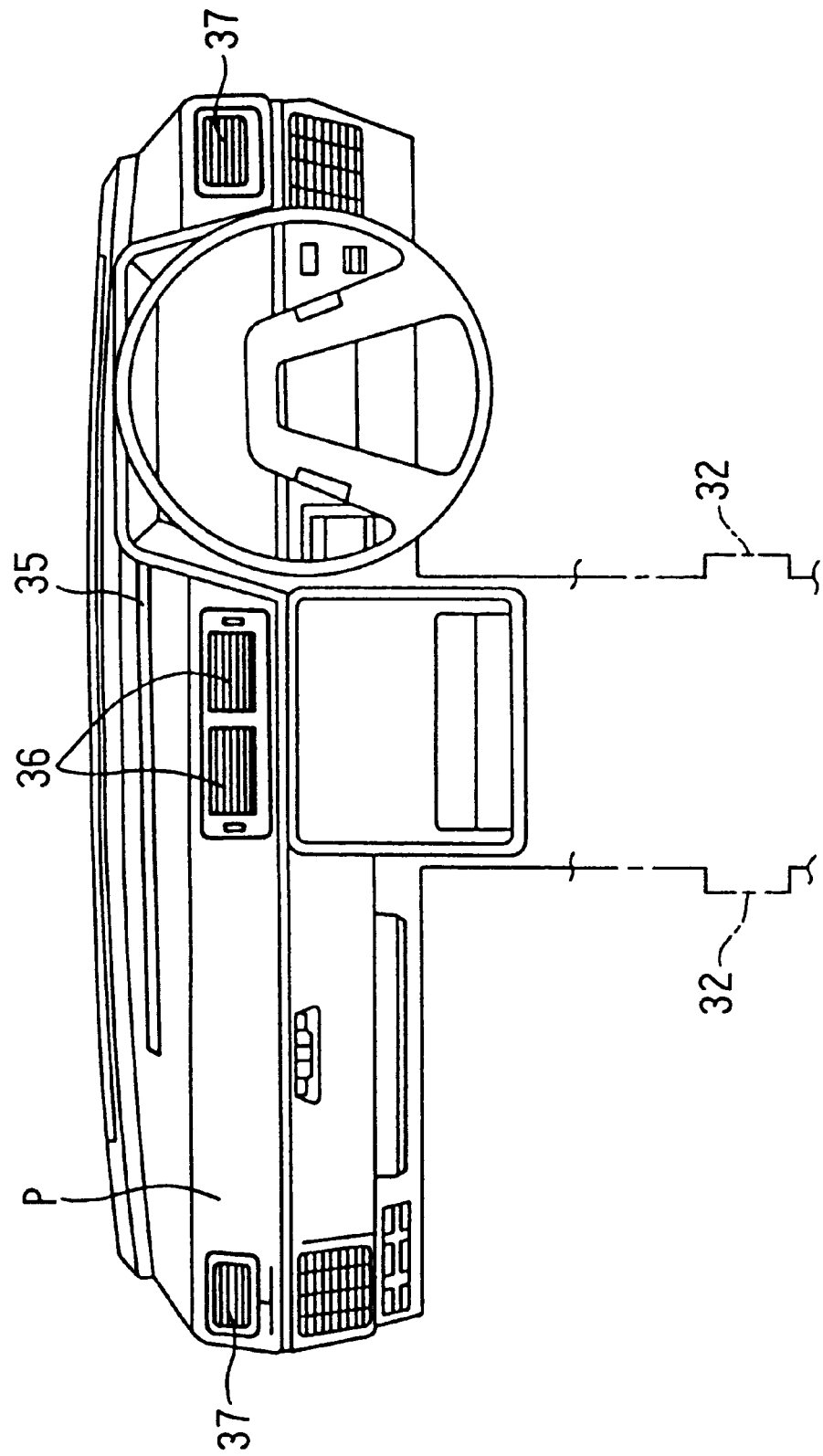

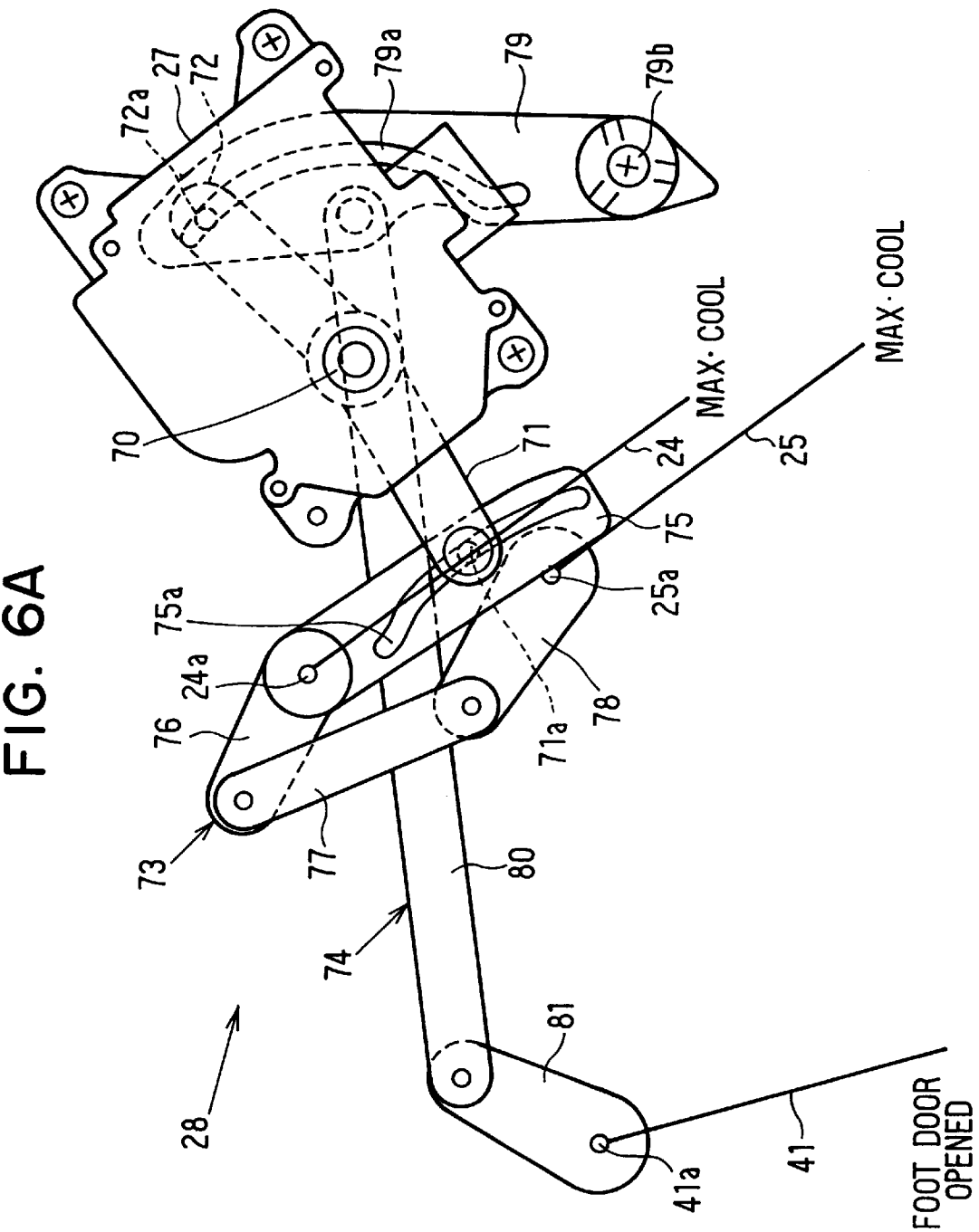

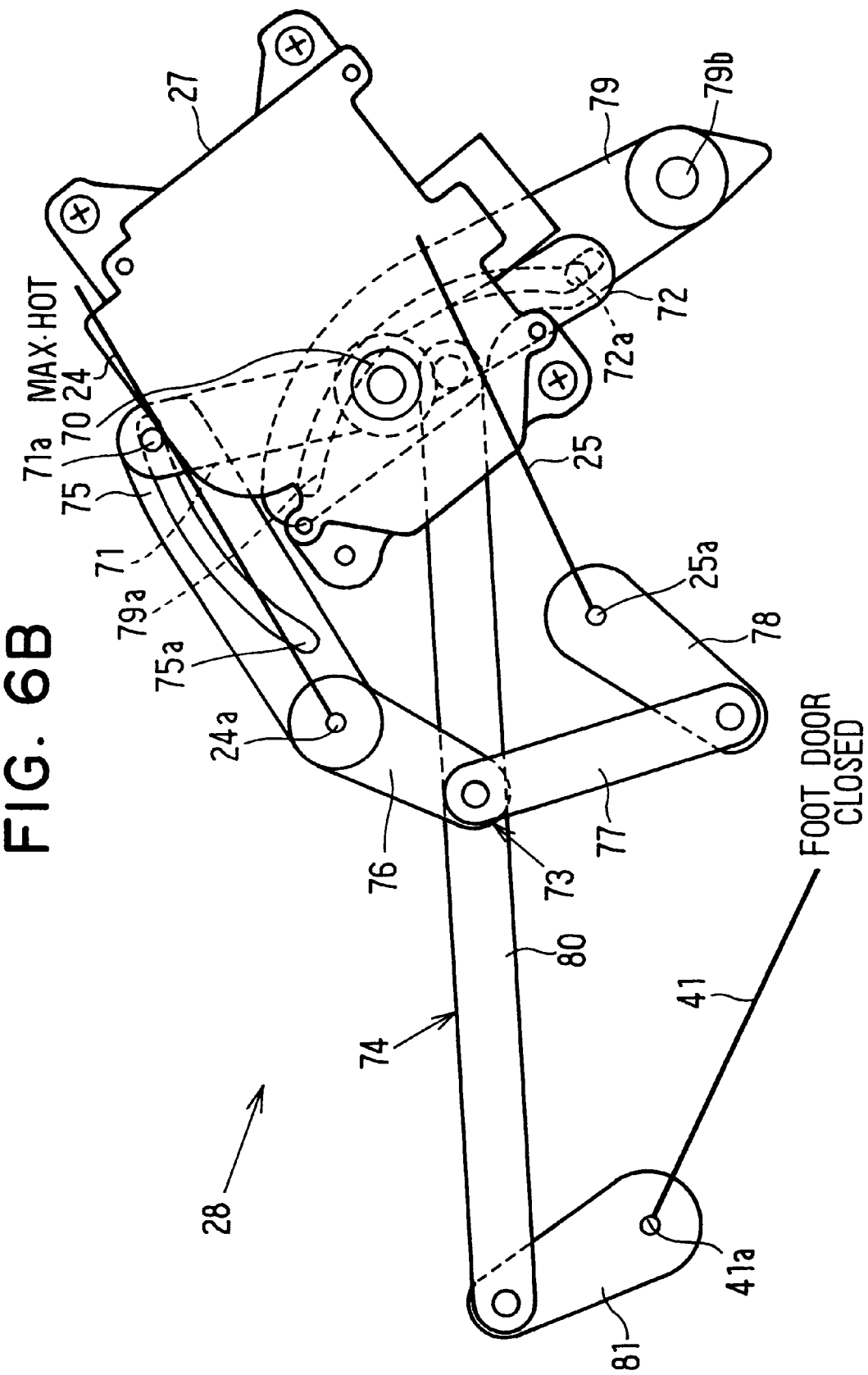

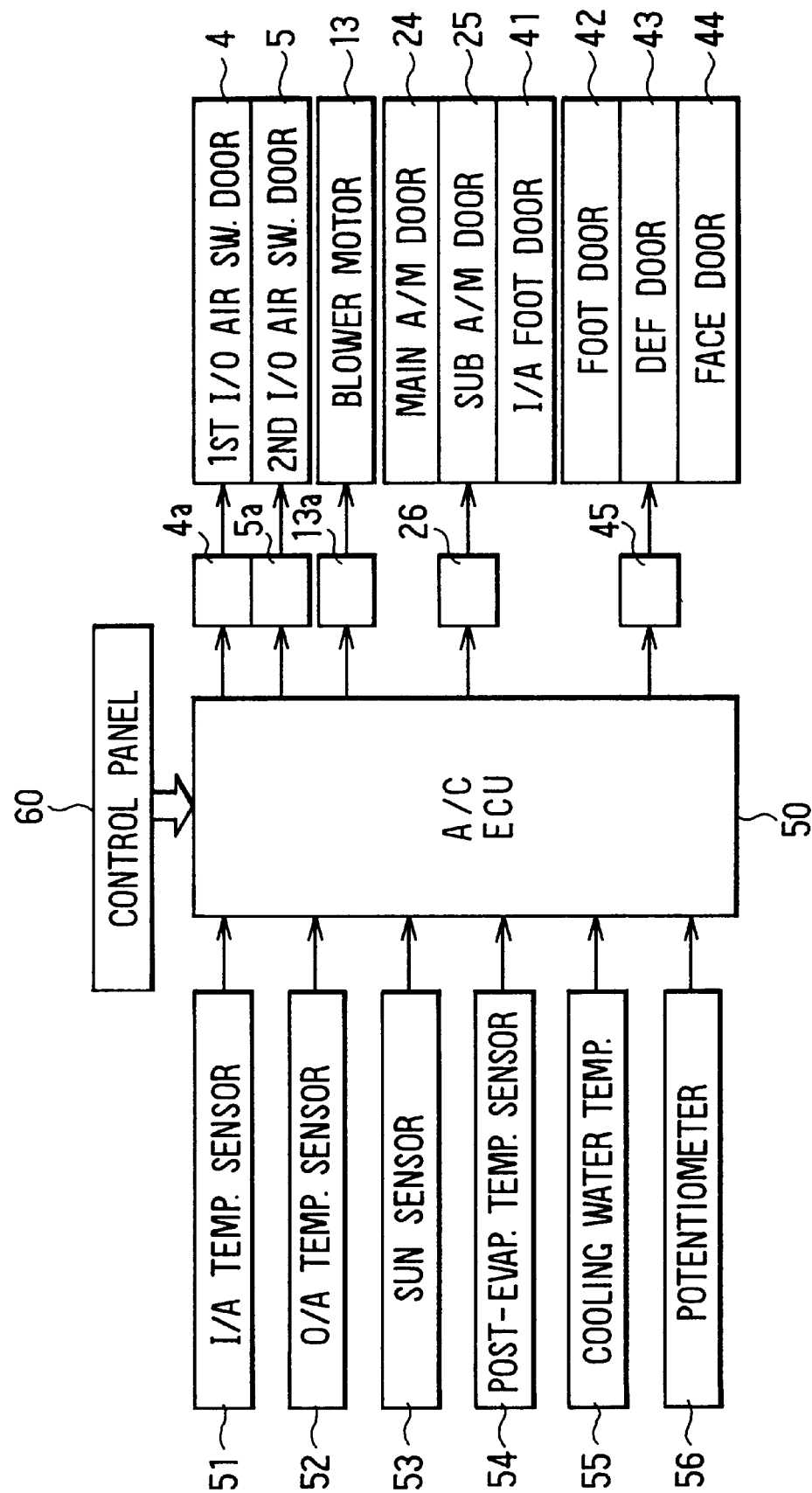

FIG. 16  2ND PATTERN FOOT, F/D
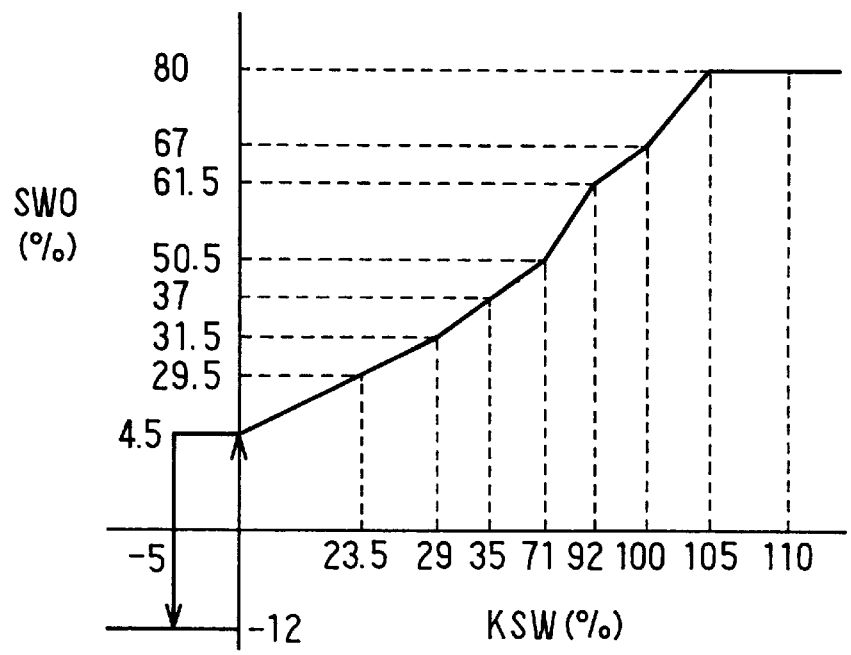
FIG. 17
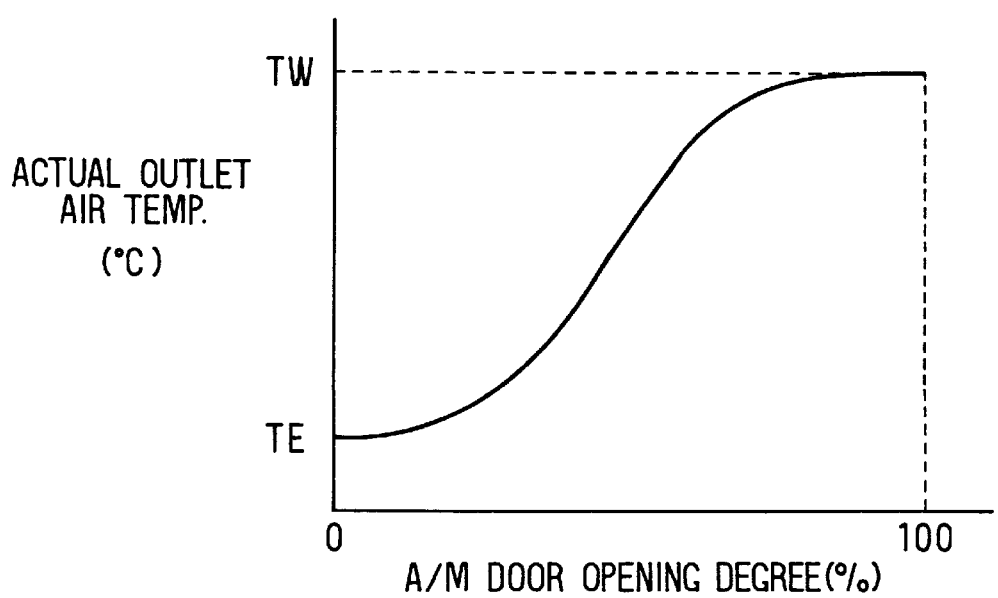

AUTOMOTIVE AIR-CONDITIONER WITH VENT AND AIR-MIXING DOOR INTERLOCKING MECHANISM

CROSS-REFERENCE TO RELATED APPLICATION

This application is related to, and claims priority from, Japanese Patent Application Hei. 9-278464.

BACKGROUND

1. Technical Field

This invention relates generally to automotive air conditioners, and more particularly to an automotive air conditioner provided with an inner/outer-air bi-level unit including a partitioning member that forms a first air passage to introduce passenger-compartment inner air and a second air passage to introduce passenger-compartment outer air.

2. Discussion

In a conventional automotive air conditioner, the temperature of engine coolant water supplied to a heat exchanger does not rise sufficiently during winter. This condition is due largely to a drop in engine generated-heat as a result of the improvement in automotive fuel-consumption performance. Therefore, heating capacity within a passenger compartment becomes insufficient, and adequate heating is not obtained.

To avoid the above-described condition, one type of conventional an automotive air conditioner is provided with an inner/outer-air bi-level unit. The air conditioner ducts already-warmed passenger-compartment inner air to a first inner air passage, re-heats the inner air with a heat exchanger for heating use, and thereafter blows the inner air into the passenger compartment from a foot vent. The air conditioner also ducts low-humidity outer air to within a second outer air passage partitioned from the first air passage, reheats the outer air with the heat exchanger, and thereafter blows the outer air into the passenger compartment from a defroster vent when a vent mode is a foot mode or a foot-defroster mode.

This inner/outer-air bi-level unit also includes first and second air-mixing doors to regulate the quantity of air passing through the heat exchanger and the quantity of air bypassing the heat exchanger in each of the first and second air passages. An inner-air foot door is disposed in a passage communicating the first air passage and the foot vent, and opens the communicating passage when conditioned air is blown from the foot vent. This inner-air foot door is structured to open fully only when the vent mode of the inner/outer-air bi-level unit is an inner/outer-air bi-level mode, and to close fully during other outer-air induction modes or inner-air recirculation modes.

However, the above-proposed inner/outer-air bi-level configuration requires an actuator such as a servomotor to rotate the first and second air-mixing doors and an actuator such as a servomotor to rotate the inner-air foot door. Because of this, the number of door actuators becomes large, and control use wiring layout complexity and product cost increases.

To reduce product cost, the first and second air-mixing doors and the inner-air foot door may be interlocked with one actuator to drive the doors. In this case, when the first and second air-mixing doors begin to open, the inner-air foot door also begins to open, irrespectively of what the vent mode may be, and so conditioned air leaks from the foot vent even during a vent mode where conditioned air from the foot mode is unnecessary (for example the face mode or the defroster mode), which a rider may misinterpret as air conditioner breakdown or faulty operation.

In a case such as the foregoing where a single actuator is mechanically interlocked with the first and second air-mixing doors and the inner-air foot door, delaying the timing with which the inner-air foot door begins to open beyond the timing with which the first and second air-mixing doors begin to open may be considered.

However, when the outside temperature is moderate, such as in the spring or autumn, or when the temperature of the engine coolant water supplied to the heat exchanger is a predetermined temperature (for example 60° C.) or less (in the interval until the predetermined coolant-water temperature is reached after starting the engine), the first and second air-mixing doors assume a fully open state (the so-termed MAX HOT position) even when the vent mode is the face mode. Because of this, leakage of conditioned air from the foot vent cannot necessarily be prevented, even when the timing with which the inner-air foot door begins to open is delayed beyond the timing with which the first and second air-mixing doors begin to open.

SUMMARY OF THE INVENTION

It is an object of this invention to provide an automotive air conditioner that reduces product cost by mechanically interlocking an air-mixing door and an inner-air foot door with a single actuator. It is a further object of this invention to provide an automotive air conditioner that prevents leakage of conditioned air from a foot vent by causing opening of an inner-air foot door to be difficult even when opening the first and second air-mixing doors.

Accordingly, the present invention provides an automotive air conditioner in which the number of actuators driving various doors is reduced, and layout of wiring for control use is simplified, by mechanically interlocking a vent-switching door with a door-interconnecting unit to switch a vent mode and selectively open and close an air-mixing door to regulate blowing temperature of conditioned air blown within a passenger compartment from vents of an air-conditioner case and at least one vent with a single actuator. Therefore, product cost is reduced.

BRIEF DESCRIPTION OF THE DRAWINGS

FIG. 5 is a front view depicting an instrument panel of a hybrid automobile according to the first embodiment;

FIGS. 6A and 6B are plan views depicting a door-interlock device of main and sub air-mixing doors and a inner-air FOOT door according to the first embodiment;

FIG. 8 is a block diagram indicating a control system for the air conditioner according to the first embodiment;

FIG. 16 is a characteristic diagram indicating a second operation pattern according to the first embodiment;

FIG. 17 is a graph indicating actual blowing temperature versus the main and sub air-mixing door opening degree according to the first embodiment.

DETAILED DESCRIPTION OF THE PRESENT INVENTION

FIGS. 1–17 depict a first embodiment of this invention. FIG. 1 through FIG. 4 are drawings indicating an air-conditioning unit, and FIG. 5 is a drawing indicating an instrument panel of a hybrid automobile.

The air conditioner for the hybrid-automobile use according to this embodiment is an automotive air conditioner structured to maintain the temperature within the passenger compartment at a set temperature by controlling, with an air-conditioner control unit (hereinafter termed "air-conditioner ECU") 50, several air-conditioning devices (actuators) on an air-conditioning unit 1 to air-condition an automobile passenger compartment.

The air-conditioning unit 1 is mounted on the front side within the passenger compartment, and is provided with an air-conditioner case, or housing, 2 that forms an inner/outer-air bi-level unit. This air-conditioner case 2 is structured by joining an inner/outer-air switching unit, a centrifugal blower, and a vent-switching unit sequentially at an air-upstream side.

Figure 1:
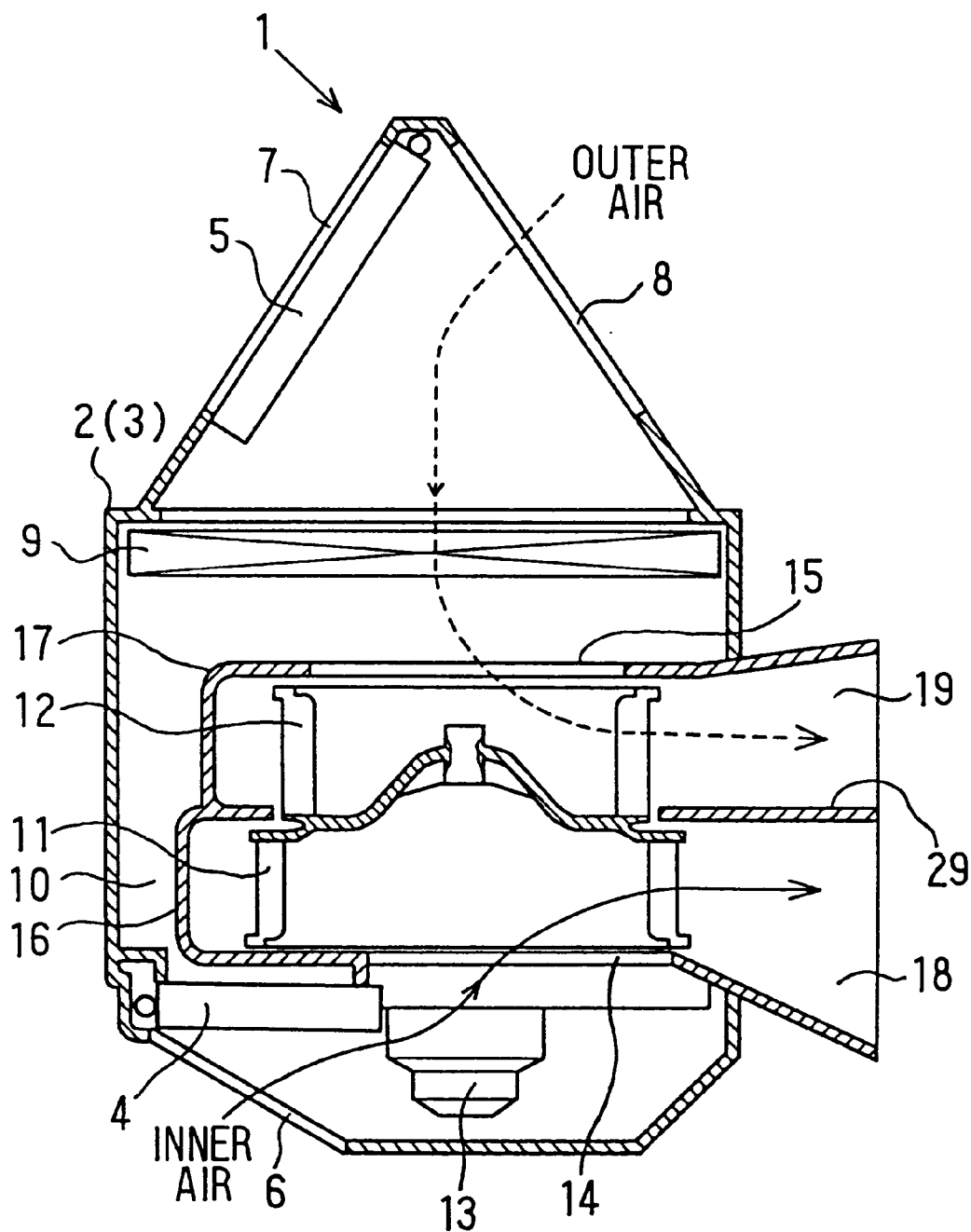
FIG. 1 is a sectional view indicating an inner/outer-air bi-level mode of an inner/outer-air switching unit and a centrifugal blower of an air-conditioning unit according to a first embodiment of the present invention.
Figure 3:
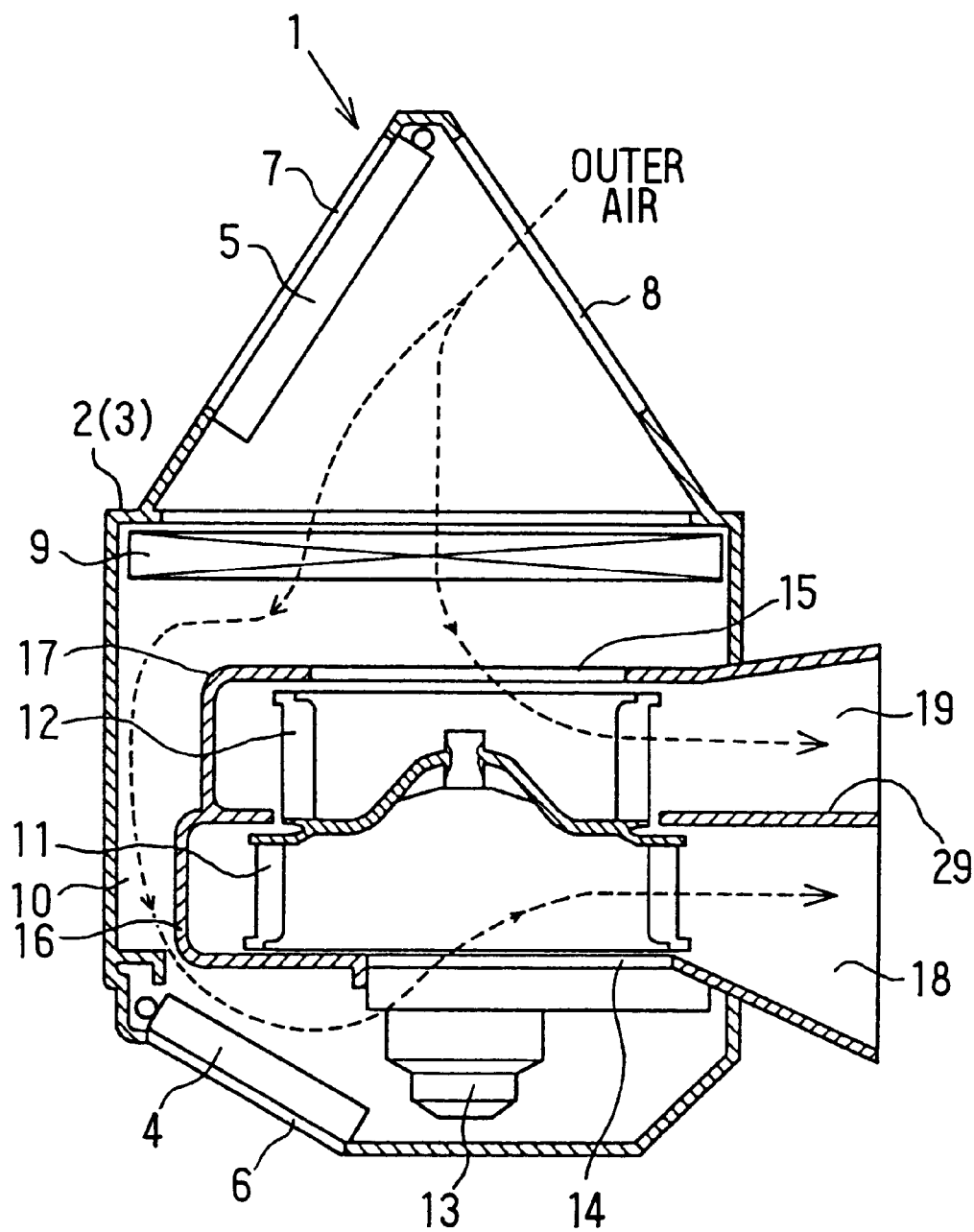
FIG. 3 is a sectional view indicating an outer-air introduction mode of the inner/outer-air switching unit and the centrifugal blower of the air-conditioning unit according to the first embodiment.

As shown in FIG. 1 and FIG. 3, the inner/outer-air switching unit is for taking at least one or both of passenger-compartment inner air or air from outside of the passenger-compartment into the air-conditioner case 2. The inner/outer-air switching unit includes an inner/outer-air switching box 3 including an air uppermost upstream-side portion, and first and second inner/outer-air switching doors 4, 5 that are freely rotatable inside this inner/outer-air switching box 3.

A first inner-air intake port 6 is formed at one end portion of the inner/outer-air switching box 3. A second inner-air intake port 7 and an outer-air intake port 8 are formed at the other end portion of the inner/outer-air switching box 3.

The first inner/outer-air switching door 4 is a door of planar shape that opens and closes the first inner-air intake port 6. The second inner/outer-air switching door 5 is a door of planar shape that opens and closes the second inner-air intake port 7 and the outer-air intake port 8. Servomotors 4a, 5a, (refer to FIG. 8) and a link mechanism (not illustrated) are interconnected with the first and second inner/outer-air switching doors 4, 5 respectively to rotate the doors.

Referring again to FIG. 1, an air filter 9 for capturing foreign matter such as dust or dirt in the air to clean the air is incorporated within the inner/outer-air switching box 3. A passage 10 communicating the second inner-air intake port 7 or the outer-air intake port 8 and the first inner-air intake port 6 is formed in the inner/outer-air switching box 3. Accordingly, the first inner/outer-air switching door 4 fully closes the communicating passage 10 when the first inner-air intake port 6 is fully opened as shown in FIG. 1, and fully opens the communicating passage 10 when the first inner-air intake port 6 is fully closed as shown in FIG. 3.

As shown in FIG. 1, the centrifugal blower is disposed substantially in the central interior of the inner/outer-air switching box 3, and includes first and second centrifugal fans 11, 12, and a blower motor 13, enabled by a blower drive circuit 13a, to drive the first and second centrifugal fans 11, 12. Herein, the first and second centrifugal fans 11, 12 are integrally formed, with the diameter of the second centrifugal fan 12 being smaller than that of the first centrifugal fan 11.

The first and second centrifugal fans 11, 12 are housed respectively within first and second scroll-casing portions 16, 17 wherein first and second intake ports 14, 15 formed on an air-intake side thereof present a bell-mouth configuration. The terminus portions (air-blowing side) of the first and second scroll-casing portions 16, 17 share a partitioning panel 29, and communicate with first and second air passages 18, 19, respectively.

Figure 2:
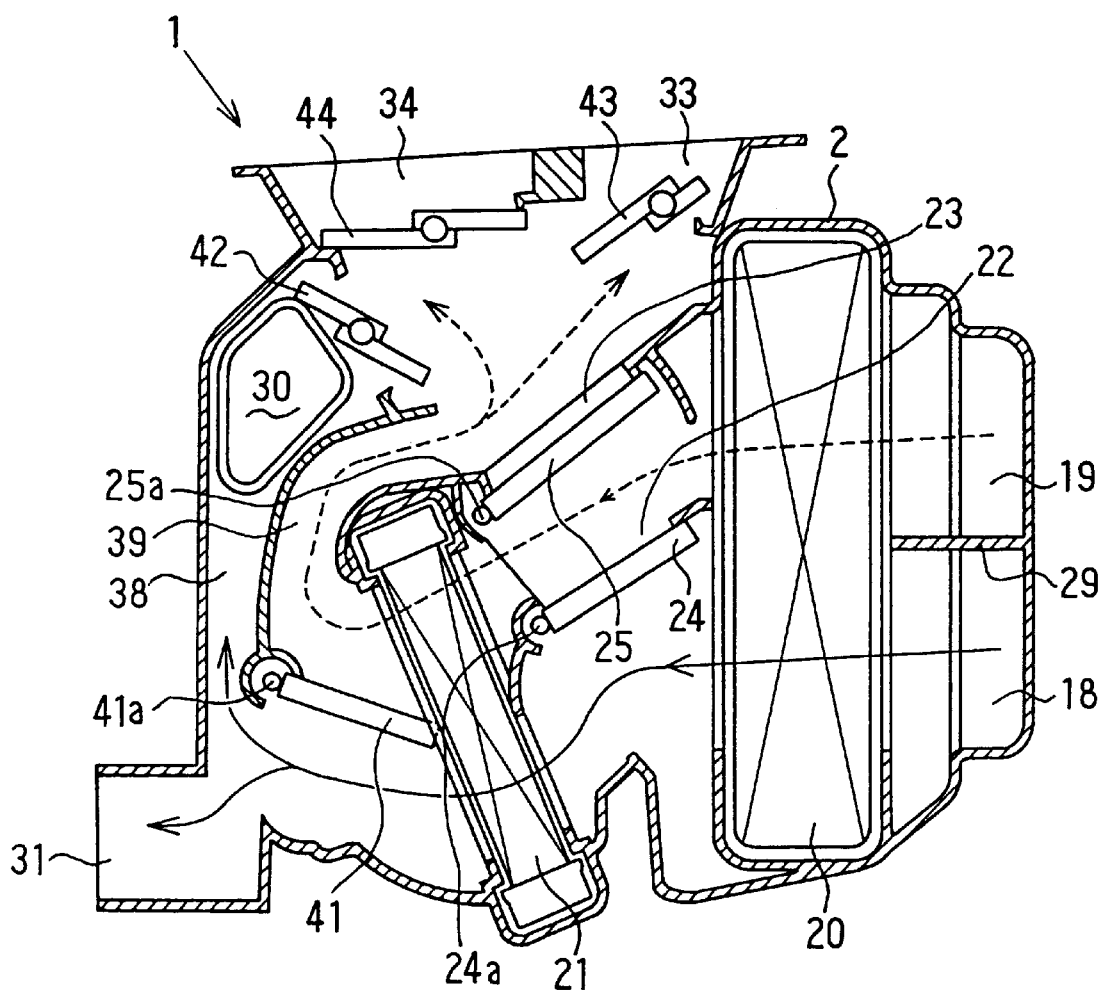
FIG. 2 is a sectional view indicating the inner/outer-air bi-level mode of an intake-port switching unit of the air-conditioning unit according to the first embodiment.

Referring to FIG. 2, disposed within the air-conditioner case 2 that forms the vent-switching unit is an evaporator 20, which is part of a refrigeration cycle. The refrigeration cycle is made up of a compressor to compress and discharge refrigerant by a drive force from the automobile engine, a condenser to condense and liquefy compressed refrigerant, a receiver to separate the condensed refrigerant into vapor and liquid and allow only liquid refrigerant to flow downstream, an expansion valve to pressure-reduce and expand liquid refrigerant, and the above-described evaporator 20 to evaporate pressure-reduced and expanded refrigerant (note that only the evaporator is shown).

The evaporator 20 is affixed within a partitioning panel 29 which will be described later, to block the entire surface of an internal space of the air-conditioner case 2. The evaporator 20 chills air passing through the evaporator 20 and dehumidifies air passing through the evaporator 20. That is to say, the evaporator 20 is made up of a first chilling portion to chill air flowing within the first air passage 18 and a second chilling portion 19 to chill air flowing within the second air passage 19.

The compressor is interconnected with an electromagnetic clutch (not shown) to intermittently convey rotational drive power from the automobile engine to the compressor. During engagement of the clutch, rotational power of the engine is conveyed to the compressor, and an air-chilling effect is exerted by the evaporator 20. When the clutch is disengaged, the engine and the compressor, and thus the chilling effect exerted by the evaporator 20, are interrupted.

Figure 4:
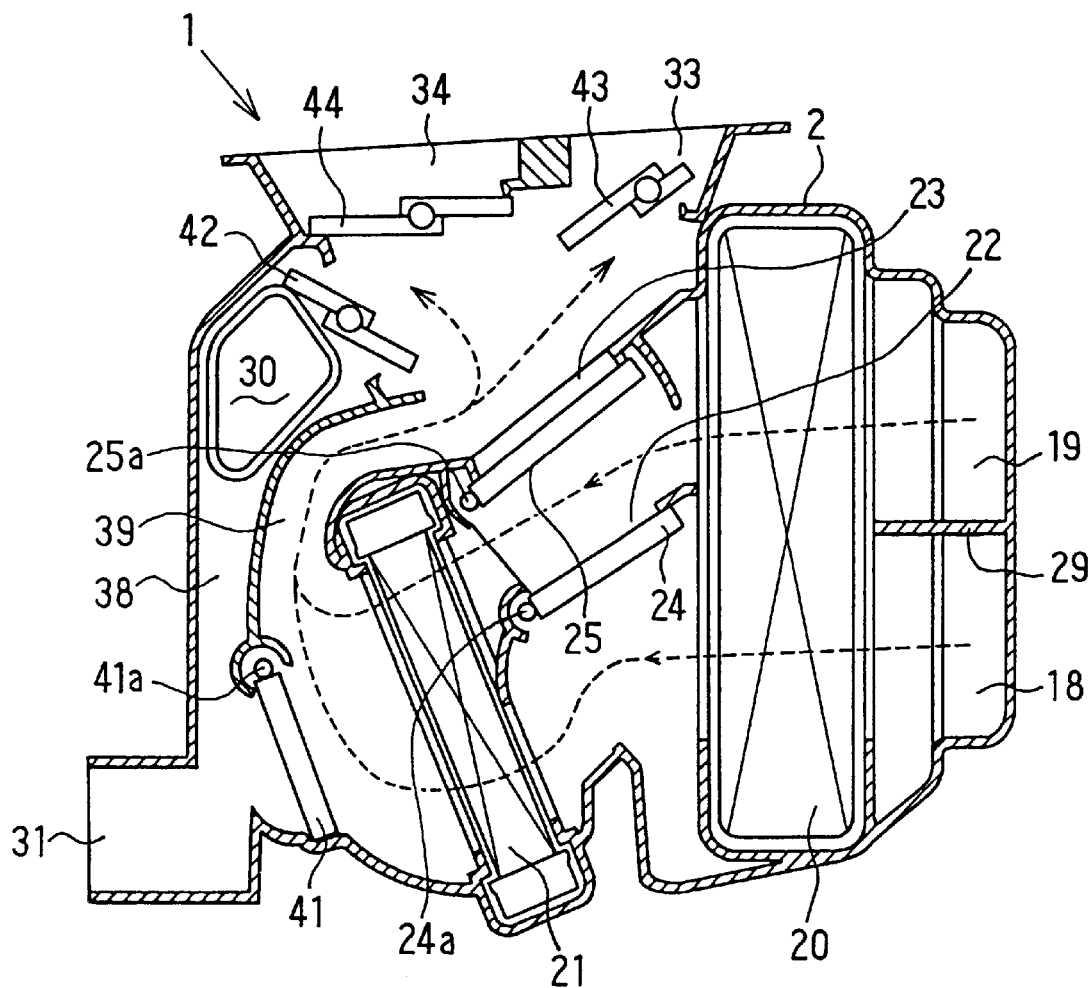
FIG. 4 is a sectional view indicating an outer-air introduction mode of the intake-port switching unit of the air-conditioning unit according to the first embodiment.

A heater core 21 is provided on an air-downstream side of the evaporator 20 to reheat chilled air which has passed through the evaporator 20. As shown in FIG. 2 and FIG. 4, this heater core 21 forms first and second bypass passages 22, 23 through which chilled air can bypass the heater core 21. Coolant water which has cooled the engine flows within the heater core 21, and the heater core 21 utilizes this coolant water as a heat source to reheat chilled air.

The heater core 21 is oriented within the partitioning panel 29 in the case 2 in a manner that is angled with respect to the vertical orientation of the evaporator. The heater core 21 includes a first heating portion to heat air flowing within the first air passage 18, and a second heating portion to heat air flowing within the second air passage 19. Main and sub air-mixing doors 24, 25 of planar shape are rotatably joined to the panel 29 at the air-upstream side of the heater core 21.

The main and sub air-mixing doors 24, 25 are interconnected to an air-mixing door actuator 27 (FIGS. 6A–6B) incorporating a servomotor 26 (FIG. 8) therewithin, and a door-interlock device 28 (FIGS. 6A–6B). The main and sub air-mixing doors 24, 25 are selectively rotated by the air-mixing door actuator 27.

More specifically, the main and sub air-mixing doors 24, 25 vary continuously (linearly) from a fully closed state (0%) to a fully open state (100%) as the target opening degree of the servomotor 26 (servomotor opening degree: SWO) increases. Due to this, the main and sub air-mixing doors 24, 25 function as first and second blowing-temperature regulating units by regulating the air quantity passing through the heater core 21 and air quantity passing through the first and second bypass passages 22, 23.

As shown in FIG. 2 and FIG. 4, the partitioning panel 29 partitions the interior of the vent-switching unit, thereby forming the first air passage 18 through which chiefly inner air flows and the second air passage 19 through which chiefly outer air flows. The evaporator 20 and the heater core 21 straddle the first air passage 18 and the second air passage 19.

The first air passage 18 is an inner-air path for inner air taken in chiefly from the first inner-air intake port 6 and blown from a front foot (FrFOOT) opening portion 30 and a rear foot (RrFOOT) opening portion 31 through a front foot vent 32 and a rear foot vent (not illustrated).

The second air passage 19 is an outer-air path for outer air taken in chiefly from the outer-air intake port 8 and subsequently blown from a defroster (DEF) opening portion 33 and a face (FACE) opening portion 34 through a defroster (DEF) vent 35, a center face vent 36, and a side face vent (FIG. 5).

The partitioning panel 29 is a partitioning member that partitions the interior of the air-conditioner case 2 to form the first air passage 18 and the second air passage 19. Referring to FIG. 2, first and second air-influx passages 38, 39 communicating the first air passage 18 and the second air passage 19 are formed on the lowermost air-downstream side. The first and second air-influx passages 38, 39 are opened and closed by an inner-air foot door 41 and a foot door 42 which will be described later. The first air-influx passage 38 corresponds to a communicating passage according to this invention.

A front foot duct (not illustrated) is connected to the FrFOOT opening portion 30. Mainly warm air is blown toward the foot area of a rider in a front seat from the FrFOOT vent 32, which is the lowermost air-downstream side end of this front foot duct. A rear foot duct (not illustrated) is connected to the RrFOOT opening portion 31. Mainly warm air is blown toward the foot area of a rider in a rear seat from the RrFOOT vent, which is the lowermost air-downstream side end of this rear foot duct. A defroster duct (not illustrated) is connected to the DEF opening portion 33. Mainly warm air is blown from toward the inner surface of the windshield the DEF vent 35, which is the lowermost air-downstream side end of this defroster duct.

A center face duct and a side face duct (both not illustrated) are connected to the FACE opening portion 34. Conditioned air introduced in the center face duct is blown toward the head and chest area of a rider in the front seat from the center FACE vent 36, which is the lowermost air-downstream side end of the center face duct. Further, conditioned air introduced in the side face duct is blown toward the head and chest area of a rider in the front seat or toward a side window glass from the side FACE vent 37, which is the lowermost air-downstream side end of the side face duct.

Accordingly, the inner-air foot door 41, the foot door 42, a defroster door 43, and a face door 44 are located on the air-upstream side of the several opening portions 30, 31, 33, 34 and the first and second air-influx passages 38, 39.

The inner-air FOOT door 41 is a vent-switching door to open and close the first air-influx passage 38 communicating the first air passage 18 with the FrFOOT vent 32 and the RrFOOT opening portion 31. The FOOT door 42 is a vent-switching door to open and close the second air-influx passage 39 linking the first and second air passages 18, 19 with the FrFOOT vent 32 and the RrFOOT opening portion 31. The DEF door 43 is a vent-switching door to open and close an air-influx passage to the defroster duct, and the FACE door 44 is a vent-switching door to open and close an air-influx passage to the center face duct.

The inner-air FOOT door 41, similar to the main and sub air-mixing doors 24, 25, interconnects the air-mixing door actuator 27 incorporating the servomotor 26 (refer to FIG. 8) therewithin, and the door-interlock device 28. The inner-air FOOT door 41 rotates due to drive by the air-mixing door actuator 27. That is to say, the opening degree of the inner-air FOOT door 41 varies continuously (linearly) from a fully closed state (0%) of the first air-influx passage 38 to a fully open state (100%) as the target opening degree of the servomotor 26 (SWO) increases.

Additionally, the remaining vent-switching doors 42 through 44 are interconnected by a servomotor 45 (refer to FIG. 8) and a link mechanism (not illustrated) as an actuator, and are driven by the servomotor 45. That is to say, the several vent-switching doors 41 through 44 move due to the servomotor 45 driving the link mechanism, so that the several vent modes are obtained.

The air-influx passage to the side face duct is not opened and closed by the several vent-switching doors 41 through 44. Rather, a vent grille (not illustrated) by which a rider manually opens and closes the side FACE vent 37 is provided near the side FACE vent 37.

Figure 7:
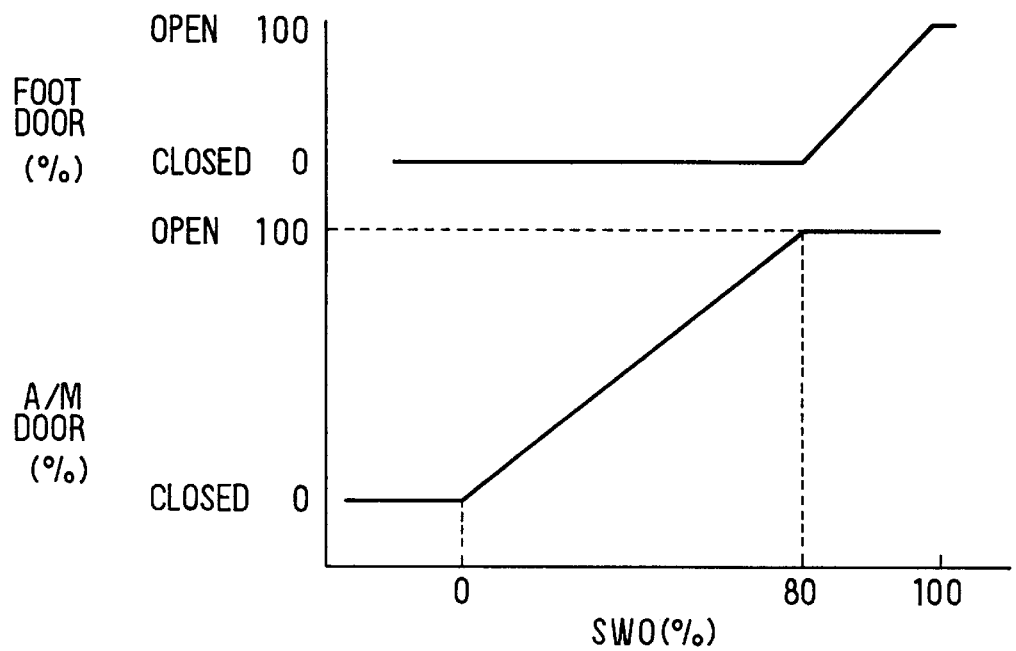
FIG. 7 is a characteristic diagram indicating the degree of opening of an inner-air FOOT door and a main and sub air-mixing door with respect to the degree of opening of a servomotor, according to the first embodiment.

The structure of the air-mixing door actuator 27 and the door-interlock device 28 will be described next with reference to FIGS. 6A–6B and FIG. 7. Herein, FIGS. 6A–6B depict the door interlock of the main and sub air-mixing doors 24, 25 and the inner-air FOOT door 41, and FIG. 7 is a characteristic diagram indicating the inner-air FOOT door opening degree and the main and sub air-mixing door opening degrees with respect to the servomotor opening degree.

Referring to FIGS. 6A–6B, the air-mixing door actuator 27 corresponds to the actuator according to this invention. The air-mixing door actuator 27 is securely tightened together with and fastened to an outer-wall surface of the air-conditioner case 2 by a fastener such as a screw, and incorporates therewithin a drive mechanism of the servomotor 26 and a potentiometer 56. Accordingly, a first output lever 71 for rotating the main and sub air-mixing doors 24, 25 with fulcra (rotating shafts 24a and 25a) as centers and a second output lever 72 for rotating the inner-air FOOT door 41 with a fulcrum (rotating shaft 41a) as a center are fixed to an output shaft 70 of the servomotor 26. Engagement pins 71a, 72a, which rotate integrally with the first and second output levers 71, 72 are provided at end portions of the first and second output levers 71, 72.

The door-interlock device 28 interconnects the main and sub air-mixing doors 24, 25 and the inner-air FOOT door 41 to mechanically interlock with the single servomotor 26. This door-interlock device 28 includes an air-mixing door link mechanism 73 to interconnect the main and sub air-mixing doors 24, 25 with the air-mixing door actuator 27, and a FOOT-door link mechanism 74 to interconnect the inner-air FOOT door 41 with the air-mixing door actuator 27.

The air-mixing door link mechanism 73 includes a main link plate 75, an interconnecting plate 76 having an end portion rotatably interconnected an end portion of the main link plate 75, an interconnecting plate 77 having a first end portion rotatably interconnected to another end portion of the interconnecting plate 76, and a sub link plate 78 having an end portion rotatably interconnected to another end portion of the interconnecting plate 77. The main link plate 75 has an engagement hole 75a in which the engagement pin 71a of the first output lever 71 is secured. The rotating shafts 24a, 25b of the main and sub air-mixing doors 24, 25 are fixed to the main and sub link plates 75, 78, respectively.

The engagement hole 75a of the main link plate 75 is shaped so that the main link plate provides a certain degree of play, or lost motion, to the engagement pin 71a corresponding to a first operation pattern (air-mixing door operation pattern) of the main and sub air-mixing doors 24, 25. As shown in the characteristic diagram of FIG. 7, this first operation pattern moves the main and sub air-mixing doors 24, 25 in correspondence with the servomotor opening degree (SWO) to rotate the main and sub air-mixing doors 24, 25 from a fully closed state (MAX COOL) to a fully open state (MAX HOT) in an interval where the target opening degree of the servomotor 26 is from a first predetermined value (for example 0%) up to a second predetermined value (for example 80%).

The FOOT door link mechanism 74 includes a main link plate 79, an interconnecting plate 80 having an end portion rotatably interconnected to the main link plate 79, and a sub link plate 81 rotatably interconnected to another end portion of the interconnecting plate 80. The main link plate 79 has an engagement hole 79a in which the engagement pin 72a of the second output lever 72 is secured, and rotates with a fulcrum 79b as the center. The rotating shaft 41a of the inner-air FOOT door 41 is fixed to an end portion of the sub link plate 81.

The engagement hole 79a of the main link plate 79 is formed in a shape corresponding to a second operation pattern (inner-air FOOT door operation pattern) of the inner-air FOOT door 41. As shown in the characteristic diagram of FIG. 7, this second operation pattern moves the inner-air FOOT door 41 in correspondence with the servomotor opening degree (SWO) to rotate the inner-air FOOT door 41 from a fully closed state (MAX COOL) to a fully open state (MAX HOT) in an interval where the servomotor opening degree (SWO) is from the second predetermined value (for example 80%) up to a third predetermined value (for example 100%). That is to say, a predetermined amount of play is provided by the engagement hole 79a so that the inner-air FOOT door 41 does not open when the servomotor opening degree (SWO) ranges from the first predetermined value (for example 0%) to the second predetermined value (for example 80%). In other words, the main link plate 79 is structured as a lost-motion type link.

The structure of a control system according to this embodiment will be described next with reference to FIG. 8, which is a block diagram depicting the control system of an air conditioner for hybrid-automobile use.

Respective sensor signals from an inner-air temperature sensor 51 to detect air temperature within the passenger compartment and from an outer-air temperature sensor 52 to detect air temperature outside the passenger compartment are input to the air-conditioner ECU 50 to control the several air-conditioning devices of the air-conditioning unit 1.

Additionally, respective sensor signals from a sunlight sensor 53 to detect a quantity of sunlight entering the passenger compartment, from a post-evaporator temperature sensor 54 to detect the air-cooling degree of the evaporator 20, from a coolant-water temperature sensor 55 to detect the temperature of coolant water flowing into the heater core 21, and from the potentiometer 56 incorporated within the air-mixing door actuator 27 are input to the air-conditioner ECU 50.

Among the foregoing, the post-evaporator temperature sensor 54 is, in specific terms, a post-evaporator temperature-detecting unit which is a thermistor or the like to detect air temperature on the first air passage 18 side immediately after passing through the evaporator 20. The potentiometer 56 is a servomotor opening-degree detecting unit to detect the actual opening degree of the main and sub air-mixing doors 24, 25 and the actual opening degree of the inner-air FOOT door 41 by detecting the actual opening degree (SW) of the servomotor 26.

Accordingly, a microprocessor of known art, including a CPU, ROM, RAM, and the like (not illustrated) is disposed within the air-conditioner ECU 50. The structure is such that signals from the various above-described sensors 51 through 55 are input to the microprocessor after analog-to-digital by an input circuit (not illustrated) within the air-conditioner ECU 50. The air-conditioner ECU 50 is supplied with power from a battery (not illustrated) when an ignition switch (not illustrated) of the engine is switched on.

Figure 9:
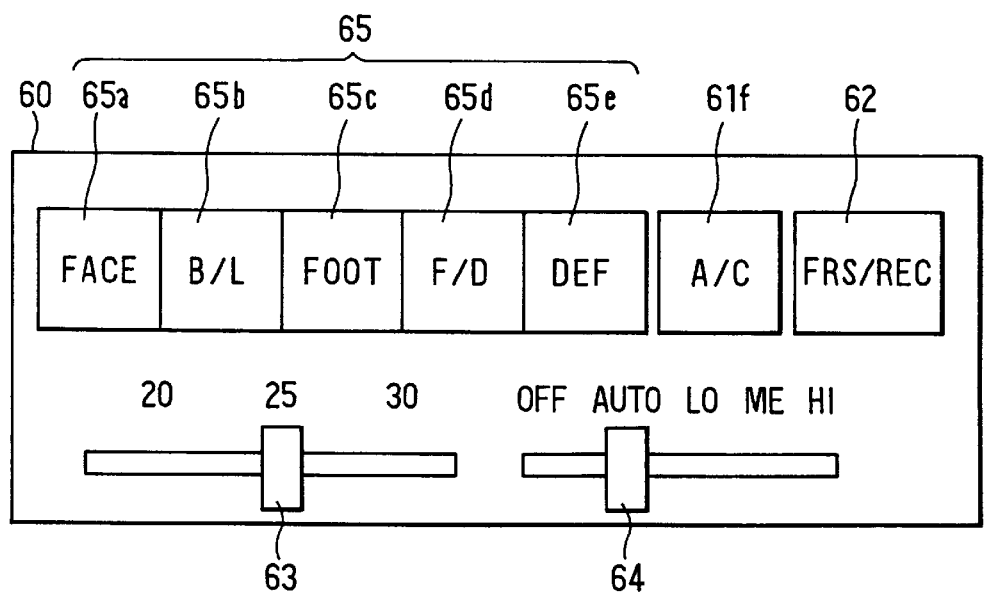
FIG. 9 is a plan view depicting a control panel according to the first embodiment.

Switch signals from several switches on a control panel 60 disposed in a substantially central portion of an instrument panel P in the passenger compartment are input to the air-conditioner ECU 50. Herein, as shown in FIG. 9, the several switches on the control panel 60 are an air-conditioner (A/C) switch 61 for instructing starting or stopping of a compressor, an inner/outer-air selector switch 62 for switching an intake mode, a temperature-setting lever 63 for setting the temperature within the passenger compartment to a desired temperature, an air-quantity selector lever 64 for switching the amount of blown air of the first and second centrifugal fans 11 and 12, a vent selector switch 65 for switching the vent mode, and so on.

In a case where the lever position of the air-quantity selector lever 64 among the foregoing is set to OFF, the blower motor 13 is disabled. In a case where the lever position is at AUTO, the blower voltage of the blower motor 13 is automatically controlled. Further, in a case where the lever position is at LO, ME, or HI, the blower voltage of the blower motor 13 is fixed respectively at a minimum value, an intermediate value, or a maximum value.

Accordingly, the vent selector switch 65 includes a face (FACE) button 65a for fixing at a face mode, a bi-level (B/L) button 65b for fixing at a B/L mode, a foot (FOOT) button 65c for fixing at a FOOT mode, a foot-defroster (F/D) button 65d for fixing at an F/D mode, and a defroster (DEF) button 65e for fixing at a DEF mode.

Next, a method of control implemented by the air-conditioner ECU 50 according to this embodiment will be described with reference to FIG. 10 through FIG. 16. Herein, FIG. 10 is a flow diagram showing basic control processing by air-conditioner ECU 50.

Figure 10:
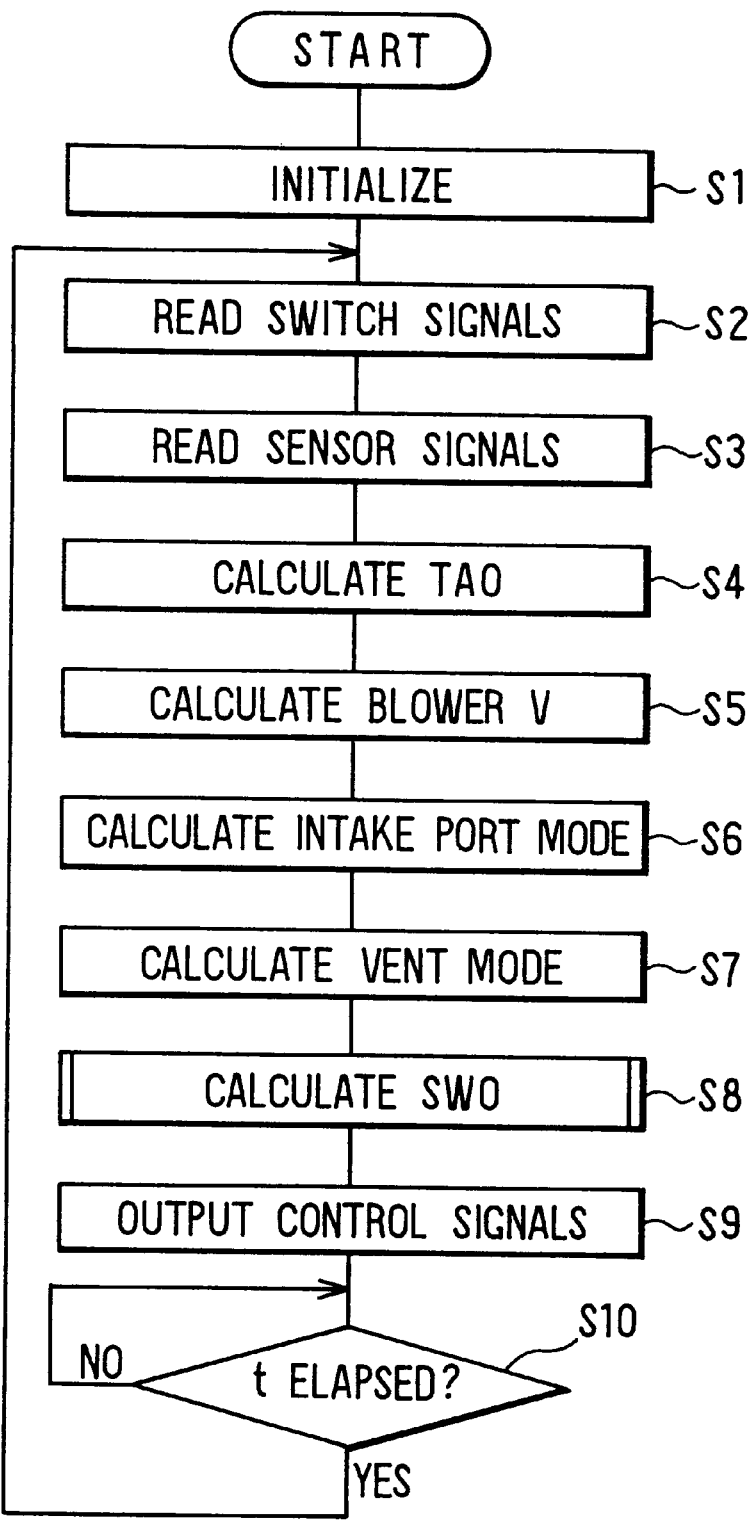
FIG. 10 is a flow diagram indicating basic control processing by an air-conditioner ECU according to the first embodiment.
Figure 11:
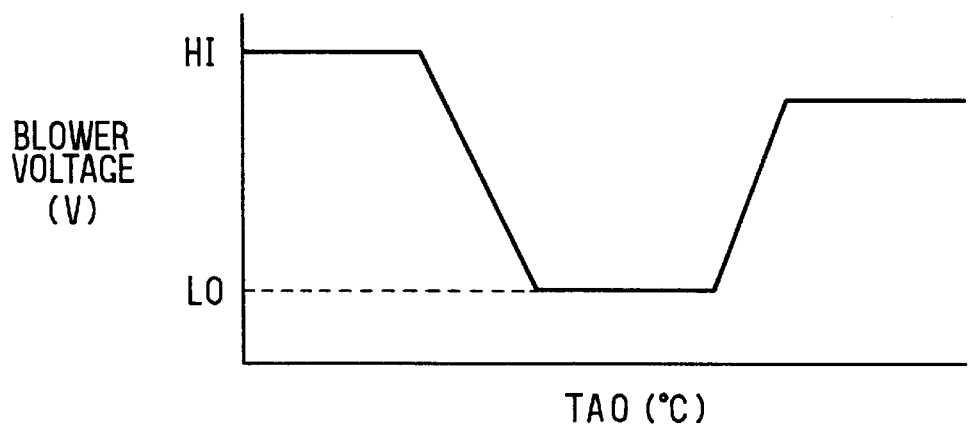
FIG. 11 is a characteristic diagram indicating the relationship between target blown-air temperature and blower voltage according to the first embodiment.
Figure 12:
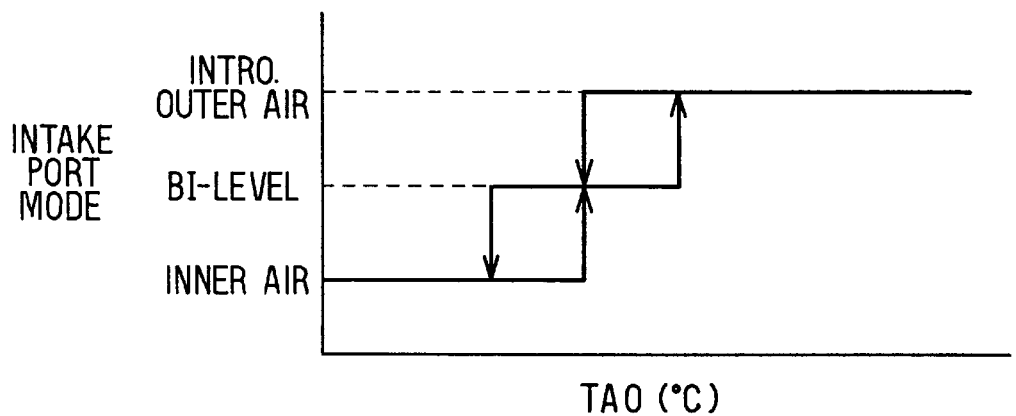
FIG. 12 is a characteristic diagram indicating the relationship between target blown-air temperature and intake-port mode according to the first embodiment.
Figure 13:
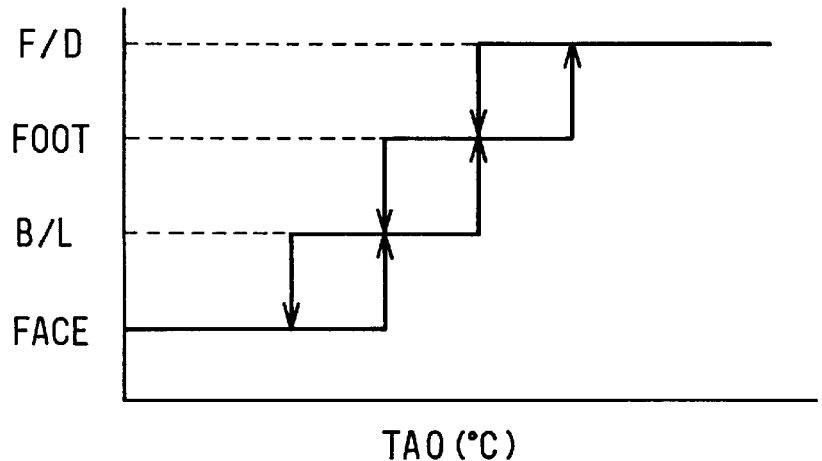
FIG. 13 is a characteristic diagram indicating the relationship between target blown-air temperature and vent mode according to the first embodiment.

When the ignition switch is switched on and power is supplied to the air-conditioner ECU 50, the routine in FIG. 10 is started, and various initializations and initial settings are performed (step S1).

Next, switch signals are read from several switches such as the inner/outer-air selector switch 62, the temperature-setting lever 63, and the vent selector switch 65 (step S2).

Next, analog-to-digital converted signals of the several sensor signals from several sensors such as the inner-air temperature sensor 51, the outer-air temperature sensor 52, the sunlight sensor 53, the post-evaporator temperature sensor 54, the coolant-water temperature sensor 55, and the potentiometer 56 are read (step S3).

Next, a target blown-air temperature (TAO) of air blown into the passenger compartment is calculated (determined) on a basis of Equation 1, which is stored in ROM (step S4).

$$TAO = KSET*TSET - KR*TR - KAM*TAM - KS*TS + C \quad \text{Equation 1}$$

Here, TSET is a temperature set with the temperature-setting lever, TR is inner-air temperature detected by the inner-air temperature sensor 51, TAM is outer-air temperature detected by the outer-air temperature sensor 52, and TS is amount of sunlight detected by the sunlight sensor 53. KSET, KR, KAM, and KS are gain, and C is a constant for compensation use.

Next, blower voltage corresponding to the target blown-air temperature (TAO) is calculated from a characteristic diagram (FIG. 11) stored in ROM (step S5).

Next, an intake-port mode corresponding to the target blown-air temperature (TAO) is calculated from a characteristic diagram (FIG. 12) stored in ROM (step S6). Herein, in a case of automatic control, the intake-port mode is determined so that an inner-air re-circulating mode, an inner/outer-air bi-level mode, or outer-air introduction mode is assumed as the target blown-air temperature (TAO) goes from a low temperature to a high temperature. Additionally, when the inner/outer-air selector switch 62 has been operated by a rider, that is, in a case of manual control, the intake-port mode is fixed at either the inner/outer-air bi-level mode or the outer-air introduction mode.

Next, a vent mode corresponding to the target blown-air temperature (TAO) is calculated from a characteristic diagram (FIG. 13) stored in ROM (step S7). Herein, in a case of automatic control, the vent mode is determined so that the FACE mode, the B/L mode, the FOOT mode, or the F/D mode is assumed as the target blown-air temperature (TAO) goes from a low temperature to a high temperature.

Additionally, when the vent selector switch 65 has been operated by a rider, that is, in a case of manual control, the vent mode is fixed at the vent mode set by either the FACE button 65a, the B/L button 65b, the FOOT button 65c, the F/D button 65d, or the DEF button 65e of the vent selector switch 65 on the control panel 60. It is also acceptable to determine the vent mode solely by manual control.

Figure 14:
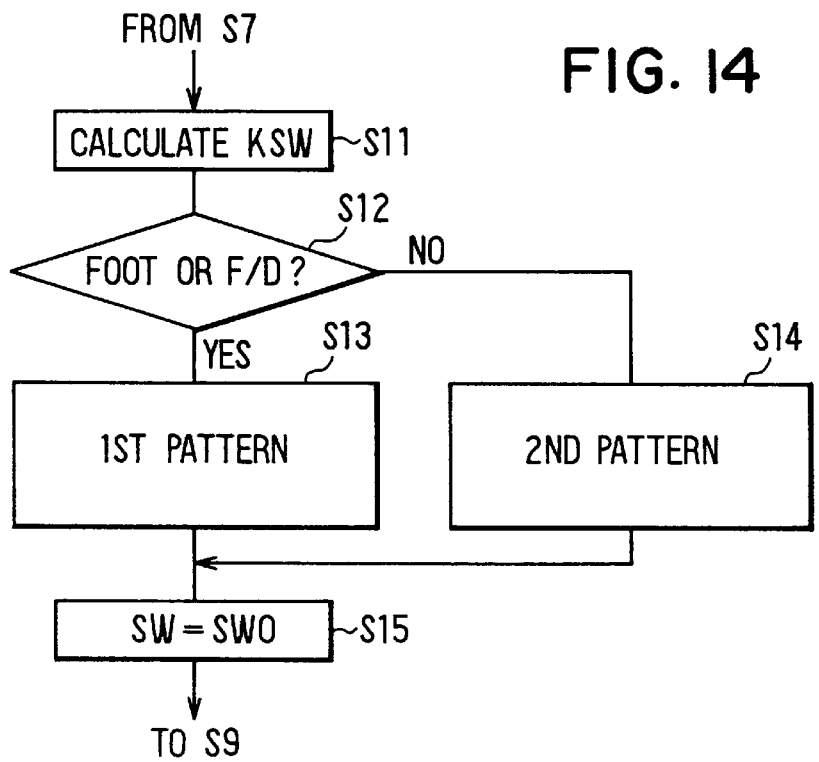
FIG. 14 is a flow diagram indicating control processing for servomotor opening-degree determination according to the first embodiment.

Next, the subroutine of FIG. 14 starts, and the target opening degree of the servomotor 26 (SWO) is determined (step S8).

Next, control signals are output to the blower drive circuit 13a and the servomotors 26, 45 to obtain the several control states calculated or determined in the several steps S5 through S8. Further, control signals are output to the servomotors 4a, 5a to drive the first and second inner/outer-air switching doors 4, 5 (step S9).

Accordingly, in step S10, the elapse of t which is the control cycle time (for example 0.5 sec. to 10 sec.) is awaited, and control processing returns to step S2.

Control processing for determining the servomotor opening degree will be described next with reference to FIG. 14 through FIG. 17. Herein, FIG. 14 is a flow diagram indicating control processing for determining the servomotor opening degree.

First, when the subroutine of FIG. 14 starts, a provisional target opening degree of the servomotor 26 (KSW) to interlock the main and sub air-mixing doors 24, 25 and the inner-air FOOT door 41 is calculated on a basis of Equation 2, which is stored in ROM (step S11).

$$KSW = \{(TAO-TE)/(TW-TE)\}*100(\%) \quad \text{Equation 2}$$

Here, TE is the post-evaporator temperature detected by the post-evaporator temperature sensor 54, and TW is the coolant-water temperature detected by the coolant-water temperature sensor 55.

Next, the vent mode determined in step S7 is discriminated. Here it is determined whether or not the vent mode is the FOOT mode or the F/D mode (step S12). In a case of an affirmative determination, the target opening degree of the servomotor 26 (SWO) corresponding to the provisional target opening degree (KSW) of the servomotor 26 is calculated from a characteristic diagram (FIG. 15) stored in ROM (step S13).

In a case of a negative determination at step S12, the target opening degree of the servomotor 26 (SWO) corresponding to the provisional target opening degree (KSW) of the servomotor 26 is calculated from a characteristic diagram (FIG. 16) stored in ROM (step S14). Here, the difference between FIG. 15 and FIG. 16 is that the maximum values of the servomotor opening degree (SWO) differ, so that the inner-air FOOT door 41 does not open in a vent mode other than the FOOT mode or the F/D mode, so that it is difficult for SWO to reach 80% or more.

Next, the servomotor 26 is controlled so that the actual opening degree of the servomotor 26 detected by the potentiometer 56 (SW) coincides with the servomotor opening degree (SWO) determined in step S13 or step S14 (step S15). Thereafter, processing exits the subroutine shown on FIG. 14.

Figure 15:
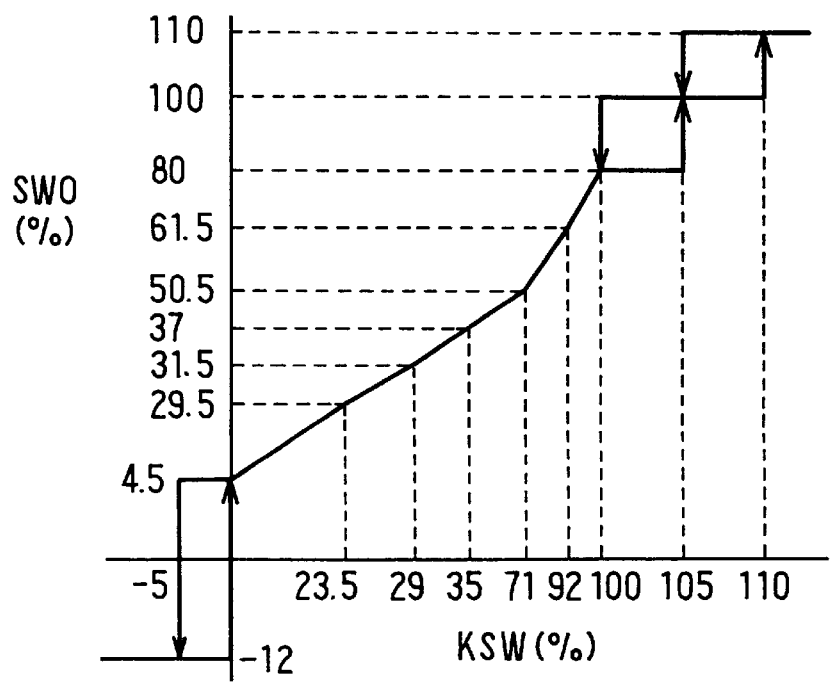
FIG. 15 is a characteristic diagram indicating a first operation pattern according to the first embodiment.

The characteristic diagrams of FIG. 15 and FIG. 16 are according to a multiple linear approximation formula (three-line approximation formula), but this multiple linear approximation formula corrects a nonlinear temperature-control characteristic of the air-conditioning unit 1. Generally, as shown in the graph of FIG. 17, the relationship between the air-mixing door opening degree and the actual blowing temperature is nonlinear. Therefore, when the servomotor opening degree (SWO) is calculated from the provisional servomotor opening degree (KSW), the temperature-control characteristic of the air-conditioning unit 1 is set to become larger in a region where the temperature-control characteristic is flat, and to become smaller in a region where the temperature-control characteristic rises.

Next, the mode of operation of the several air-conditioning devices of the air-conditioning unit 1 according to the present embodiment will be described briefly with reference to FIGS. 1 through 17. FIG. 6A illustrates a state of the door-interlock device 28 representing MAX COOL of the main and sub air-mixing doors 24, 25, and FIG. 6B illustrates a state of the door-interlock device 28 representing MAX HOT. Additionally, FIG. 6A illustrates a state of the door-interlock device 28 representing a fully opened state of the inner-air FOOT door 41, and FIG. 6B illustrates a state of the door-interlock device 28 representing a fully closed state of the inner-air FOOT door 41.

When the FACE button 65a or the B/L button 65b of the vent selector switch 65 is pressed and the FACE mode or the B/L mode is initiated, when SWO is calculated to be less than or equal to 0 (%), the main and sub air-mixing doors 24, 25 are controlled at a position (MAX COOL) passing all of the chilled air from the evaporator 20 to the first and second bypass passages 22, 23. Further, when SWO is calculated to be greater than or equal to 80 (%), the main and sub air-mixing doors 24, 25 are controlled at a position (MAX HOT) passing all of the chilled air from the evaporator 20 to the heater core 21.

Accordingly, when SWO is calculated to be greater than 0 (%) and less than 80 (%), the main and sub air-mixing doors 24, 25 are controlled at a position passing the chilled air from the evaporator 20 both to the heater core 21 and to the first and second bypass passages 22, 23. However, as shown in FIG. 7 and FIG. 8, the inner-air FOOT door 41 never opens the first air-influx passage 38, even when the servomotor opening degree (SWO) changes from the first predetermined value (for example 0%) to the second predetermined value (for example 80%); that is, even when the main and sub air-mixing doors 24 and 25 rotate from MAX COOL to MAX HOT.

Herein, calculation is such that the provisional servomotor opening degree (KSW) becomes 100% or more when coolant-water temperature (TW) is low, even if hypothetically the target blown-air temperature (TAO) is a low temperature. However, as shown in the characteristic diagram of FIG. 16, the servomotor opening degree (SWO) never exceeds 80%, and so even in this case the inner-air FOOT door 41 never opens the first air-influx passage 38. Due to this, in a case where the vent mode is the FACE mode or the B/L mode, leakage of conditioned air from the FrFOOT vent 32 or the RrFOOT vent cannot occur.

In a case where the FOOT button 65c or the F/D button 65d of the vent selector switch 65 is pressed and the FOOT mode or the F/D mode is effected, when the provisional servomotor opening degree (KSW) becomes 100% or more, the servomotor opening degree (SWO) easily exceeds 80%, as shown in the characteristic diagram of FIG. 16. In this case, temperature control of warm air blown from the FrFOOT vent 32 and the RrFOOT vent can be performed in correspondence with the opening degree of the inner-air FOOT door 41 by the inner-air FOOT door 41 opening the first air-influx passage 38, and an inner/outer-air bi-level mode can be formed as the intake-port mode.

Herein, in a case where the target blown-air temperature (TAO) is an intermediate value and the intake mode is determined to be the inner/outer-air bi-level mode, as shown in FIG. 1 the inner air taken into the inner/outer-air switching box 3 from the first inner-air intake port 6 by the rotation of the first centrifugal fan 11 passes through the first intake port 14, is taken into the first scroll-casing portion 16, and enters the first air passage 18, as shown by the unbroken-line arrow in FIG. 1. Accordingly, the inner air which has entered the first air passage 18 is chilled while passing through the first chilling portion of the evaporator 20 and becomes chilled air, and thereafter passes through the first heating portion of the heater core 21 and flows into the first air-influx passage 38, as shown by the unbroken-line arrow in FIG. 2.

Accordingly, the inner air has which has passed through the first air passage 18 flows into the first air-influx passage 38, passes through the Fr and RrFOOT opening portions 30, 31, and is blown from the FrFOOT vent 32 toward the feet of a rider in the front seat in the passenger compartment and also from the RrFOOT vent toward the feet of a rider in the front seat in the passenger compartment, as shown by the unbroken-line arrow in FIG. 2.

Meanwhile, the outer air taken into the inner/outer-air switching box 3 from the outer-air intake port 8 by the rotation of the second centrifugal fan 12 passes through the second intake port 15, is take into the second scroll-casing portion 17, and enters the second air passage 19, as shown by the broken-line arrow in FIG. 1. Accordingly, the outer air which has entered the second air passage 19 is chilled while passing through the second chilling portion of the evaporator 20 and becomes chilled air, and thereafter passes through the second heating portion of the heater core 21 and flows into the second air-influx passage 39, as shown by the broken-line arrow in FIG. 2.

Accordingly, a portion of the outer air has which has passed through the second air passage 19 is blown together with the inner air from the FrFOOT vent 32 toward the feet of a rider in the front seat in the passenger compartment, and the remainder is blown from the DEF vent 35 toward the inner surface of the windshield, as shown by the broken-line arrow in FIG. 2.

In a case where the target blown-air temperature (TAO) is high and the intake-port mode has been determined to be the outer-air introduction mode, the outer air taken into the inner/outer-air switching box 3 from the outer-air intake port 8 by the rotation of the first centrifugal fan 11 passes through the communicating passage 10, is taken into the first scroll-casing portion 16, and enters the first air passage 18, as shown by the broken-line arrow in FIG. 3.

Meanwhile, the outer air taken into the inner/outer-air switching box 3 from the outer-air intake port 8 by the rotation of the second centrifugal fan 12 passes through the second intake port 15, is taken into the second scroll-casing portion 17, and enters the second air passage 19, as shown by the broken-line arrow in FIG. 3. Accordingly, the outer air which has entered the first and second air passages 18, 19 is chilled while passing through the evaporator 20 and becomes chilled air, and thereafter passes through the heater core 21.

Accordingly, the outer air has which has passed through the first and second air passages 18, 19 is mixed on the air-downstream side of the heater core 21 and becomes conditioned air of optimal temperature, as shown by the broken-line arrow in FIG. 4. Most of the conditioned air is blown from the FrFOOT vent 32 and the RrFOOT vent toward the feet of a rider in the front seat, and a portion of the conditioned air is blown from the DEF vent 35 toward the inner surface of the windshield.

As was described above, the air-conditioning unit 1 according to this embodiment is structured to mechanically interlock the main and sub air-mixing doors 24, 25 and the inner-air FOOT door 41 with the single servomotor 26 via the door-interlock device 28, as shown in the characteristic diagrams of FIGS. 6A, 6B and FIG. 7. For this reason, the number of actuators driving various doors such as the intake-port switching door, the air-mixing doors, and the vent-switching door is reduced, and layout of wiring for control use for the servomotors incorporated within these actuators is simplified, and so product cost of the air-conditioning unit 1 can be reduced.

Accordingly, in a case where the servomotor opening degree (SWO) which is the target opening degree of the servomotor 26 is 0% (the first predetermined value) or less, the opening degree of the main and sub air-mixing doors 24, 25 and the opening degree of the inner-air FOOT door 41 are also 0%. As SWO increases in the interval where the servomotor opening degree (SWO) is 0% up to 80%, the air-mixing door opening degree changes from 0% (MAX COOL, fully closed state) to 100% (MAX HOT, fully open state), but the inner-air FOOT door opening degree remains unchanged at 0% (fully closed state). Further, in a case where the servomotor opening degree (SWO) is 80% (the second predetermined value) or more, the air-mixing door opening degree remains unchanged at 100%, but the inner-air FOOT door opening degree changes from 0% up to 100% as SWO increases.

Accordingly, the calculation characteristic from the provisional servomotor opening degree (KSW) to the servomotor opening degree (SWO) when the vent mode is the FOOT mode or the F/D mode is such that SWO is 80% when KSW is 100%, SWO is 100% when KSW is 105%, and SWO is 110% when KSW is 110%, as shown in the characteristic diagram of FIG. 15. Additionally, the calculation characteristic from KSW to SWO when the vent mode is the FACE mode or the B/L mode (i.e., other than the FOOT mode or the F/D mode) is such that SWO is 67% when KSW is 100%, SWO is 80% when KSW is 105%, and SWO is 80% when KSW is 110%, as shown in the characteristic diagram of FIG. 16.

That is to say, it is more difficult for SWO to reach 80% or more with the calculation characteristic during other than the FOOT mode or the F/D mode than with the calculation characteristic during the FOOT mode or the F/D mode. Consequently, it is more difficult for the inner-air FOOT door 41 to open during the FOOT mode or the F/D mode than during the FOOT mode or the F/D mode. Due to this, in a case of moderate outdoor temperature period, such as during the spring or autumn, or in a case where the temperature of engine coolant water supplied to the heater core 21 is a predetermined temperature (for example 60° C.) or less, even when the main and sub air-mixing doors 24, 25 assume the MAX HOT position even when the vent mode is the FACE mode or the B/L mode, it is difficult for the inner-air FOOT door 41 to open, and so leakage of conditioned air from the FrFOOT vent 32 and the RrFOOT vent can be prevented completely.

Additionally, in a case where the intake-port mode is the inner/outer-air bi-level mode and the vent mode is the FOOT mode or the F/D mode, the passenger compartment can be heated by taking in already-warmed high-temperature inner air into the first air passage 18, heating this inner air with the heater core 21, and blowing this inner air into the passenger compartment from the FrFOOT vent 32 and the RrFOOT vent. For this reason, even in a case of heating the passenger compartment wherein the temperature of the engine coolant water does not become very high, the heating performance in the passenger compartment can be improved. Because of this, the temperature within the passenger compartment can be automatically controlled to constantly maintain a set temperature. Moreover, in a case where the intake-port mode is the inner/outer-air bi-level mode, antifogging performance of the windshield can be improved by taking low-humidity outer air into the second air passage 19, heating this outer air with the heater core 21, and blowing this outer air toward the inner surface of the windshield from the DEF vent 35.

Figure 18:
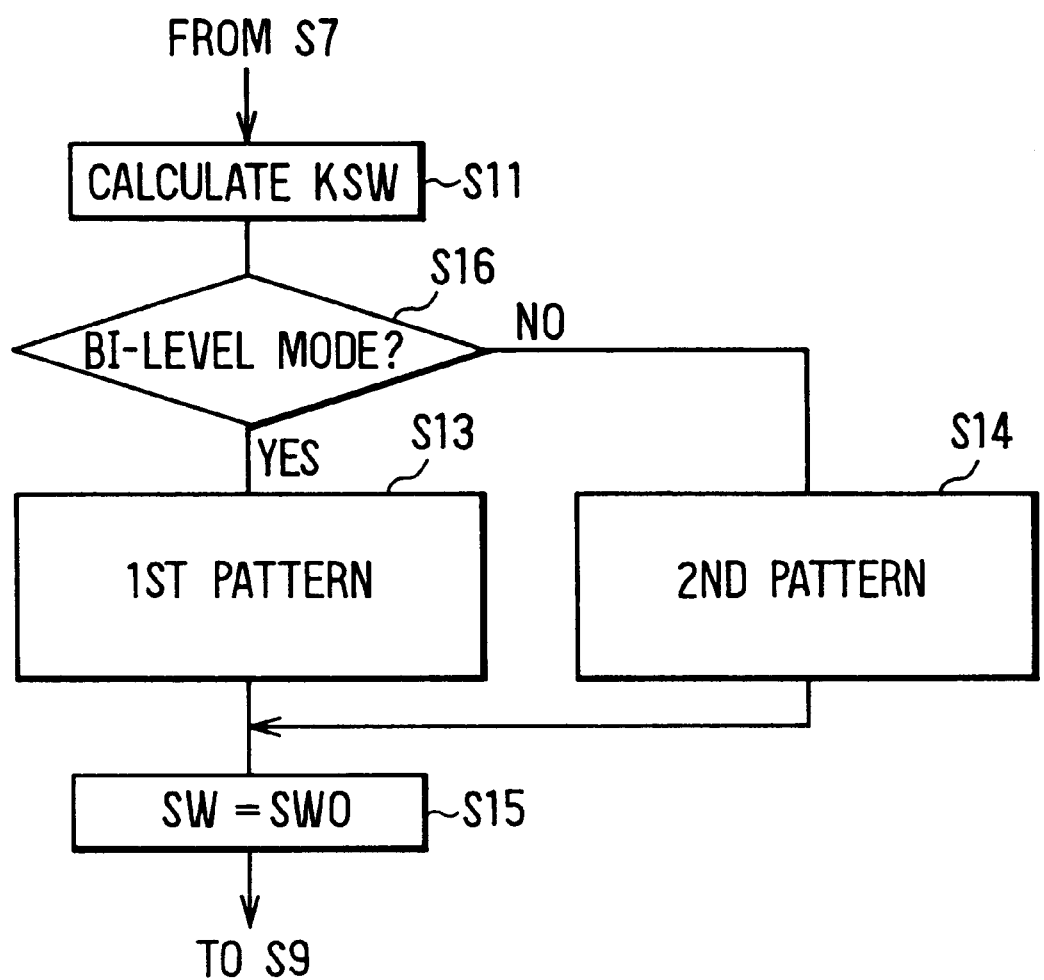
FIG. 18 is a flow diagram indicating control processing for servomotor opening-degree determination according to a second embodiment.

FIG. 18 depicts a second embodiment according to the present invention, and is a flow diagram indicating control processing for determining the servomotor opening degree. In the flow diagram of FIG. 18, control processing which is identical to the flow diagram of FIG. 4 is assigned an identical number, and description thereof will be omitted.

After the provisional servomotor opening degree (KSW) is calculated at step S11, the intake-port mode determined at step S6 is discriminated. Herein, it is determined whether the intake-port mode is the inner/outer-air bi-level mode (step S16). In a case where this determination is YES, the control processing of step S13 is performed. In a case where this determination is NO, the control processing of step S14 is performed.

Herein, temperature control in correspondence with the opening degree of the inner-air FOOT door 41 basically is performed solely when the intake-port mode is the inner/outer-air bi-level mode. Because of this, it is sufficient to provide the control processing of step S16 of the flow diagram in FIG. 18 prior to step S11 of the flow diagram in FIG. 14 according to the first embodiment. Also, it is sufficient to cause execution to advance to the control processing of step S11 when the intake-vent mode is the inner/outer-air bi-level mode and to cause execution to advance to the control processing of step S13 when the intake-vent mode is the inner-air re-circulating mode or the outer-air introduction mode.

The present invention has been described as having application in an air conditioner for hybrid-automobile use, but this invention may also be applied in an all conditioner to heat the passenger compartment of a vehicle equipped with a diesel engine, or a lean-burn engine wherein a generated-heat quantity is small. Additionally, this invention may be employed not solely in an apparatus of an inner/outer-air bi-level unit wherein the air-conditioning unit 1 has a first and second air passages 18 and 19, but in an apparatus of an air-conditioning unit having only one air passage.

With this embodiment, the evaporator 20 of the refrigeration cycle is employed as the heat exchanger for cooling use and the heater core 21 taking the coolant water of the travel-use engine as the heat source for heater use is employed as the heat exchanger for heating use. However, a heat exchanger incorporating an air-cooling component such as a Peltier element or an electrical heater may be employed as the heat exchanger for cooling use. Further, a heater core taking exhaust heat of the electrical load of a travel-use motor, an inverter, or the like or combustion heat of a combustion heater as the heat source for heater use may be employed as the heat exchanger for heating use.

This embodiment employs the inner-air FOOT door 41 to open and close the first air-influx passage 38 communicating the first heating portion (first air passage 18) of the heater core 21 with the FrFOOT opening portion 30 and the RrFOOT opening portion 31 as the vent-switching door. However, the other FOOT door 42, DEF door 43, or FACE door 44 may alternatively be employed as the vent-switching door.

When the FACE door 44 is utilized as the vent-switching door, it is acceptable to provide as a door-interconnecting unit a first link mechanism having an engagement hole of a shape corresponding to a first operation pattern to rotate the FACE door 44 from 100% (fully open state) to 0% (fully closed state) in an interval where the target displacement value of the actuator is from the first predetermined value up to the second predetermined value, and a second link mechanism having an engagement hole of a shape corresponding to a second operation pattern to rotate the main and sub air-mixing doors 24, 25 from MAX COOL to MAX HOT in an interval where the actuator target displacement value is from the second predetermined value to the third predetermined value.

While the above detailed description describes the preferred embodiment of the present invention, the invention is susceptible to modification, variation and alternation without deviating from the scope and fair meaning of the following claims.

What is claimed is:

1. An automobile air conditioner for conditioning air to be blown into an automobile passenger compartment, comprising:
 a housing defining first and second intake ports for receiving air supplied from within, and outside of, the passenger compartment respectively, and a plurality of vents for outputting conditioned air into the passenger compartment;
 a heat exchanger for heating the supplied air;
 an air bypass device that is operative to cause a predetermined quantity of the supplied air to bypass the heat exchanger;
 a vent-switching device that is operative to selectively open or close one or more of the plurality of vents;
 a linkage mechanism that interconnects the vent-switching device and the air bypass device; and
 an actuator in communication with the linkage mechanism that selectively actuates the air bypass device, the vent-switching device, or both the air bypass device and the vent-switching device, via the linkage mechanism;
 the vent-switching device being connected to the linkage mechanism via a lost motion linkage plate so that the vent-switching device is maintained in place during actuation of the air bypass device in response to a predetermined operating mode;
 wherein the housing further defines a warm air passage for causing air to pass through and to be heated by the heat exchanger, a cold air bypass passage for causing air to bypass the heat exchanger device, a mixing chamber in which both the air from the warm air passage and the air from the cold air bypass passage are mixed before being output into the passenger compartment, and a warm air bypass passage for causing the air heated by the heat exchanger to bypass the mixing chamber and to be output directly to the passenger compartment.

2. The automobile air conditioner of claim 1, wherein the air bypass device comprises first and second air-mixing doors operative to control air flow through the warm air passage and the cold air bypass passage, respectively, in response to a selected operating mode and sensed operating conditions; and
 the vent-switching device comprises a vent door operative to control air flow through the warm air bypass passage in response to the selected operating mode and the sensed operating conditions.

3. The automobile air conditioner of claim 2, wherein the actuator displaces the vent door only when the actuation level reaches a predetermined displacement quantity.

4. An automotive air conditioner, comprising:
 an air-conditioner case having a face vent for blowing conditioned air toward the head and chest area of a rider, a foot vent for blowing conditioned air toward the feet of a rider, and a defroster vent for blowing conditioned air toward an inner surface of a vehicle window glass;
 inlet port switching means having an inside air inlet port and an outside air inlet port for opening and closing said inside an air inlet port and said outside air inlet port, said inside air inlet port for introducing an inside air to said air conditioner-case, said outside air inlet port for introducing an outside air to said air-conditioner case;
 a heat exchanger to heat air flowing within said air-conditioner case;
 a communicating passage communicating an air downstream side of said heat exchanger and said foot vent;
 an air mixing door to regulate an air quantity passing through said heat exchanger and an air quantity bypassing said heat exchanger;
 a vent switching door to selectively open or close said communicating passage and at least one of said face vent, said foot vent and said defroster vent;
 a single actuator to drive at least said air mixing door and said vent switching door;
 interconnecting means to cause said air-mixing door and said vent switching door to be mechanically interlocked with said actuator;
 an air passage within said air conditioner case is partitioned to form a first air passage to induct inside air introduced by operating said inlet port switching means to said foot vent, and a second air passage to induct outside air introduced by operating said inlet port switching means to said defroster vent when said foot vent and said defroster vent are both simultaneously opened, when said air mixing door is operated at a location where said air quantity passing through said heat exchanger is maximized and a maximum heating state is established.

5. The automotive air conditioner of claim 4, further comprising:
 means for determining a target displacement quantity of the actuator; and
 means for controlling the actuator so that an actual displacement quantity of the actuator becomes a target displacement quantity determined by the determining means, wherein:
  the vent-switching door is an inner-air foot door to open and close a communicating passage communicating an air downstream side of the first heating portion of the heat exchanger and the foot vent; and
  the door-interconnecting means is provided with a first linkage providing a first operation pattern to cause the air-mixing door to be displaced from a fully closed state to a fully open state such that a target displacement quantity of the actuator is between a first predetermined value and a second predetermined value larger than the first predetermined value, and a second linkage providing a second operation pattern to cause the vent-switching door to be displaced from a fully closed state to a fully open state wherein a target displacement quantity of the actuator is between a second predetermined value and a third predetermined value larger than the first predetermined value.

6. The automotive air conditioner of claim 5, wherein the determining means comprises:
 means for detecting inner-air temperature to detect temperature within a passenger compartment;
 means for setting temperature within the passenger compartment to a desired temperature; and
 means for calculating target vent temperature of air blown into the passenger compartment from the air-conditioner case based on at least an inner-air temperature detected by the temperature-detecting means and a set temperature set by the temperature-setting means, wherein further:

a target displacement quantity of the actuator is calculated based on a target vent temperature calculated by the target-calculating means.

7. The automotive air conditioner of claim 6, wherein:

the target-determining means varies a calculation characteristic of a target displacement quantity of the actuator so that the inner-air foot door is more difficult to open when a vent mode is other than a foot mode or a foot-defroster mode.

8. The automotive air conditioner of claim 6, wherein:

the determining means varies a calculation characteristic of a target displacement quantity of the actuator so that the inner-air foot door is more difficult to open when an intake mode is an intake mode other than a bi-level mode to open the inner-air intake port and the outer-air intake port.

9. The automotive air conditioner of claim 4, further comprising:

means for determining a target displacement quantity of the actuator; and means for controlling the actuator so that an actual displacement quantity of the actuator becomes a target displacement quantity determined by the target-determining means, wherein:

the vent-switching door opens and closes the face vent; and the door-interconnecting means is provided with a first linkage providing a first operation pattern to cause the vent-switching door to be displaced from a fully closed state to a fully open state wherein a target displacement quantity of the actuator is between a first predetermined value, and a second linkage providing a second operation pattern to cause the air-mixing door to be displaced from a fully closed state to a fully open state wherein a target displacement quantity of the actuator is between a second predetermined value and a third predetermined value larger than the first predetermined value.

10. The automobile air conditioner of claim 4 wherein, the interconnecting means connects the air-mixing door and the vent-switching door to an output shaft of a power source, the interlocking means comprising:

an air-mixing door linking mechanism to move the air-mixing door between an opened and a closed position;

a first output lever connected at one end to the output shaft and at another end to the air-mixing door linking mechanism to transfer a motive force from the output shaft to the air-mixing door linking mechanism to move the air-mixing door between the opened and the closed position;

a vent-switching door linking mechanism operative to move the vent-switching door between an opened and a closed position; and a second output lever connected at one end to the output shaft and at another end to the vent-switching door linking mechanism to transfer the motive force from the output shaft to the vent-switching door to move the vent-switching door between the opened and the closed position;

the vent-switching door linking mechanism including a lost-motion link plate that causes the vent-switching door to be maintained in place when the air-mixing door linking mechanism is operative to move the air-mixing door in response to a first operating mode, and that causes the vent-switching door to be moved when the air-mixing door linking mechanism is operative to move the air-mixing door in response to a second operating mode.

* * * * *